United States Patent [19]

Lysenko

[11] 4,236,759

[45] Dec. 2, 1980

[54] HYDRAULIC SAFETY VALVE

[75] Inventor: George P. Lysenko, Dubuque, Iowa

[73] Assignee: Deere & Company, Moline, Ill.

[21] Appl. No.: 27,056

[22] Filed: Apr. 4, 1979

[51] Int. Cl.³ .......................... F16K 15/04; B60T 13/00
[52] U.S. Cl. .................................. 303/6 A; 137/519.5;
60/581; 303/84 A
[58] Field of Search ...................... 137/533.11, 533.13,
137/519.5, 498; 60/581, 591; 303/6 A, 84 A

[56] References Cited

U.S. PATENT DOCUMENTS

| 2,085,360 | 6/1937 | Hammett | 137/533.13 |
| 2,196,919 | 4/1940 | Hirschey et al. | 303/84 A X |
| 2,274,968 | 3/1942 | O'Bannon | 137/533.13 X |
| 2,296,135 | 9/1942 | Batson et al. | 137/533.13 |
| 2,305,759 | 12/1942 | Berger | 303/6 A |
| 2,710,626 | 6/1955 | Burdick et al. | 137/498 |
| 2,991,724 | 7/1961 | Crowl | 137/533.13 X |

Primary Examiner—William R. Cline

[57] ABSTRACT

The hydraulic safety valve includes a housing defining a generally cylindrical shaped chamber having an opening at both ends of the chamber, and a chamber contained generally spherical shaped member. The hydraulic safety valve is suited for deployment in a hydraulic system wherein the main hydraulic unit is in fluid communication with a remotely located workpiece via hydraulic fluid lines. The safety valve interrupts or is attached to a hydraulic line in close proximity to the main hydraulic unit and functions to protect against substantial losses of hydraulic fluid from the hydraulic system as a result of workpiece or hydraulic line failure.

3 Claims, 2 Drawing Figures

HYDRAULIC SAFETY VALVE

BACKGROUND OF THE INVENTION

The present invention relates to hydraulic systems, more particularly, to hydraulic systems which utilize discrete volumes of hydraulic fluid to perform work on a workpiece located remote from the main hydraulic unit of the hydraulic system, the main hydraulic unit being in fluid communication with the workpiece via hydraulic fluid lines.

Hydraulic systems which include a workpiece located remote from the main hydraulic unit utilize hydraulic lines to maintain fluid communication with the workpiece. In some instances, it is possible to experience a total draining of hydraulic fluid from the fluid reservoir associated with a hydraulic system as a result of hydraulic line failure (line rupture or fracture) or a failure in the workpiece. By way of illustration, the conventional vehicle hydraulic braking system contains a common hydraulic fluid reservoir which supplies fluid to a master brake cylinder or main brake valve in fluid communication with the individual brake subsystems via brake lines. Should a brake line fail or the brake actuator associated with a brake subsystem develop a leak, a means is provided through which hydraulic fluid can escape from the brake system fluid reservoir which may result in a total loss of vehicle braking capacity. Control valves have been employed in vehicle braking systems to protect the fluid reservoir should a brake line or brake actuator failure occur, in furtherance of operational integrity between the forward and rear brakes of a vehicle, i.e., a failure in either of the forward or rear brake will not deprive the housing vehicle of all braking capacity.

The control valve, in response to a fluid pressure differential resulting from a failure of either the forward or rear brakes or brake lines obstructs hydraulic fluid passage to the failed brake subsystem, either forward or rear, while allowing the remaining brake subsystems to properly function, and in so doing protects the hydraulic fluid reservoir associated with the vehicle braking system from rapid depletion.

It is sometimes desirous to maintain operational integrity and protect against fluid loss between complementing brakes, i.e., the brakes on either of a vehicle in the front or rear. For example, a crawler tractor is steered by varying the braking action between the right and left drive tracks, and many farm tractors have the ability to vary the braking action between the right and left rear wheels to achieve enhanced maneuverability. The inclusion of a conventional control valve to further integrity between complementary brakes, has displayed undesirable effects on vehicle maneuverability, in that, it has been observed that prior full actuation of either the right side brake or left side brake has resulted in the complementing brake being subsequently unengageable, which represents an unsafe condition. The undesirable effects appear to be the result of a pressure differential experienced by a contained piston of the main control valve created during the prior full actuation of the brake on one side of the vehicle.

Flow restricting orifices have been used in place of control valves to assist in creating integrity between complementing brakes. However, a flow restricting orifice only reduces the rate of fluid lost due to a failure; an orifice cannot stop the loss of fluid.

The present invention prevents appreciable hydraulic fluid volume losses from a hydraulic system, wherein discrete volumes of hydraulic fluid perform work on the remotely located workpiece, fluid losses facilitated as a result of the failure of a remotely located workpiece or a failure in a hydraulic line communicating the workpiece with the main unit of the hydraulic system.

SUMMARY OF THE INVENTION

The hydraulic safety valve includes a housing defining a generally cylindrically shaped chamber having an opening at both ends of the chamber, and a chamber contained generally spherical member. The hydraulic safety valve is suited for deployment in a hydraulic system which utilizes discrete volumes of hydraulic fluid to perform work on a remotely located workpiece. The main hydraulic unit of the hydraulic system is in communication with the workpiece via hydraulic lines, the hydraulic safety valve interrupting or being attached to the hydraulic line.

The hydraulic safety valve responds to fluid volume transfers through the chamber. As a sum certain volume of fluid enters the chamber, a corresponding volume exits the chamber. Should the volume of fluid exiting the chamber exceed a certain amount, i.e., the amount required to perform the needed work on the workpiece, the chamber contained spherical member, moving axially within the chamber in direct response to the volumetric flow, will obstruct an outlet opening inhibiting further fluid volumes from exiting the chamber.

It is an object of the present invention to define a safety valve which is relatively inexpensive and has the capacity to only allow discrete volume of fluid to pass through the safety valve irrespective of the fluid's volumetric flow rate.

DESCRIPTION OF THE PREFERRED EMBODIMENT

The present invention has particular significance when deployed in the hydraulic system of a large off-road vehicle utilizing a hydrostatic transmission. This is, because an unabated means of hydraulic fluid loss could result in a total loss of vehicle hydraulic capability including vehicle propulsion capability since the hydrostatic transmission is part of the vehicle drive system.

Figure 1:
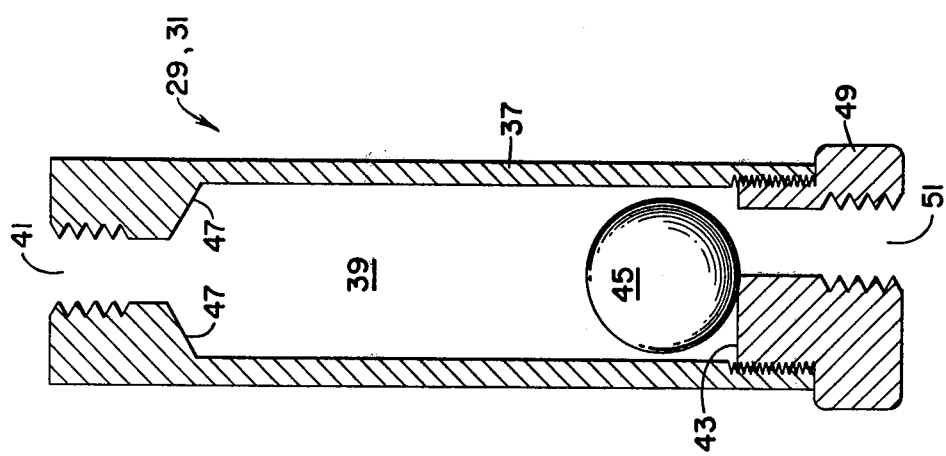
FIG. 1 is a sectional elevational view of the hydraulic safety valve.

FIG. 1 schematically shows a hydraulic system in the species of rear braking system, generally indicated as 11, of the type employed in vehicles having rear wheel assisted steering such as tractors. Pedals 13R and 13L are in communication with a conventional dual main brake valve 15 by any conventional means, being schematically indicated by dashed lines 17 and 19 respectively. Brake actuator 21R is in fluid communication with brake valve 15 via brake line 23. Brake actuator 21L is also in fluid communication with brake valve 15 via brake line 27. Brake lines 23 and 27 are each interrupted by a safety valve 29 and 31, respectively. Hydraulic fluid is delivered to the brake valve 15, via hydraulic line 33 from the pump-reservoir 35, which may be integrated to the vehicle hydrostatic transmission. Brake lines 23 and 27 continuously contain hydraulic fluid. By depressing pedal 13R, for example, main brake valve 15 is activated by conventional means to introduce a discreet volume of fluid into line 23, additional volume of fluid being supplied from the pump-reservoir 35 through line 33, to fluidly activate actuator 21R.

Figure 2:
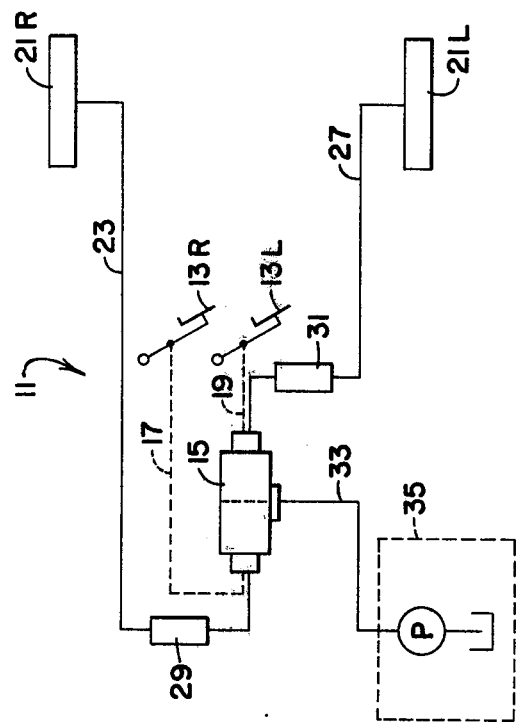
FIG. 2 is a schematic of the hydraulic safety valve used in a portion of a vehicle braking system.

The hydraulic safety valves 29 and 31 which interrupt lines 23 and 27, respectively, are each comprised of a housing 37 defining a generally cylindrical shaped chamber 39 having a first opening 41 and a second opening 43 at opposing ends of said chamber 39 (refer to FIG. 2). Contained within chamber 39 is a generally spherical element 45 having a diameter somewhat less than the diameter of chamber 39 but greater than the diameter of the first or outlet opening 41. The diameter transition from chamber 39 to outlet opening 41 is non-dramatic, thereby, creating a surface 47 to assume mating configuration to spherical element 45, such that, communication between surface 47 and element 45 will obstruct flow through outlet opening 41. The second opening 43 has a cap 49 fixably mounted therein by any conventional means. Cap 49 has an inlet opening or passage 51 of a generally cylindrical configuration disposed lengthwise throughout cap 49. The geometric center line of opening 51 is generally parallel to and removed from the geometric center line of chamber 39, such that spherical member 45 cannot obstruct flow through inlet opening 51.

Referring to FIGS. 1 and 2, since brake fluid is contained continually throughout lines 23 and 27, the addition of fluid volume into either line 23 or 27 results in a corresponding fluid volume acting on either actuators 21R or 21L, respectively. Referring to safety valves 29 and 31, the volume of fluid containable in chamber 39 between spherical member 45 and surface 47 is chosen to be slightly greater than the volume of fluid needed to activate either actuator 21R or 21L. The spherical member 45 should be constructed using a material having a complimenting specific gravity in relationship to the type of hydraulic fluid used, such that under normal operation within the expected temperature range, the intrusion of additional volumes of fluid into line 23 or 27 will displace spherical member 45 within chamber 39 a related distance without engaging surface 47. However, should a line failure of either a rupture or fracture magnitude occur or an actuator leak develop, the loss of fluid volume downline of safety valves 29 or 31 would cause spherical member 45 to contact surface 47, thereby, restricting any further fluid loss.

Optimumly, the safety valve 29 or 31 should have a generally vertical orientation within the containing hydraulic system, i.e, the outlet opening 41 should be generally elevated with respect to the inlet opening 51, to allow for gravitational effects. It is observed that the valves 29 and 31 will allow fluid flow in both directions which is necessary to allow brake release. The above-described embodiment is presented to illustrate the invention and should not limit the scope of the invention. The scope of the invention should be defined by the following claims.

I claim:

1. In a hydraulic system including a main hydraulic unit receiving hydraulic fluid from a reservoir, actuation means for actuating said main hydraulic unit, at least one remotely located fluid-responsive subsystem, at least one hydraulic line communicating said subsystem to said main hydraulic unit, said main hydraulic unit being in continuous fluid communication with said subsystems such that actuation of said main hydraulic unit by said actuation means causes the actuation of said subsystems by causing the injection of a discreet volume of fluid into said hydraulic line communicating said subsystem to said main hydraulic unit and deactivation of said main hydraulic unit retrieves said discreet volume of fluid from said hydraulic line to deactivate said subsystem, wherein the improvement comprises: a safety valve interrupting said hydraulic line in the proximity of said main hydraulic unit including a housing defining a generally cylindrical shaped chamber, said chamber having a first opening at one end of said chamber extending through said housing to said chamber and having a diameter less than said chamber such that the diameter transition of said chamber to said first opening is generally symmetric and non-dramatic creating a surface having a generally sloped cross-sectional contour, said first opening connecting with said hydraulic line leading to said subsystem, said chamber having a second opening at the opposing end of said chamber extending through said housing to said chamber; a generally spherical shaped member contained within said chamber having a diameter less than said chamber and greater than said first opening, said spherical member sized to permit the assumption of a mating relationship with said surface such that said first opening can be blocked; a cap fixably mounted in said second opening, said cap having a generally cylindrical passageway extending longitudinally therethrough, said passageway having a longitudinal axis parallel to and radially removed from said longitudinal axis of said chamber, said passageway connecting with said hydraulic line extending from said main hydraulic unit, said chamber having a generally vertical orientation such that said first opening is elevated with respect to said second opening and sized to contain said discreet volume of hydraulic fluid between said spherical member and said first opening.

2. In a hydraulic brake system for a motor vehicle having a pedal-operated main brake valve, braking means associated with each of the road-engaging wheels of said vehicle each operable by injection of a discreet volume of fluid, a brake actuator operating said braking means, a first hydraulic line connecting said main brake valve to said brake actuator of said front braking means, and a second hydraulic line connecting said main brake valve to said brake actuator of said rear braking means, wherein the improvement comprising: a housing defining a generally cylindrical shaped chamber having a first opening at one end of said chamber extending through said housing to said chamber having a diameter less than said chamber such that the diameter transition of said chamber to said first opening is generally symmetric and non-dramatic creating a surface having a generally sloped cross-sectional contour, said first opening connecting with said hydraulic line leading to said braking means, said chamber having a second opening at the opposing end of said chamber extending through said housing to said chamber; a generally spherical shaped member contained within said chamber having a diameter less than said chamber and greater than said first opening, said spherical member sized to permit the assumption of a mating relationship with said surface such that said first opening can be blocked; a cap fixably mounted in said second opening, said cap having a generally cylindrical passageway extending longitudinally therethrough, said passageway having a longitudinal axis parallel to and radially removed from said longitudinal axis of said chamber, said passageway connecting with said hydraulic line extending from said main brake valve, said chamber having a generally vertical orientation such that said first opening is elevated with respect to said second opening and said chamber being sized to contain said discreet volume of hydraulic fluid between said spherical member and said first opening.

3. In a hydraulic brake system for motor vehicles with brake steering capacity having a pedal-operated dual main brake valve, braking means associated with at least one set of complementing road-engaging wheels of the vehicle operable by injection of a discreet volume of fluid, a brake actuator operating said braking means, a first hydraulic line connected to said dual main brake valve of a first brake of said complementing brakes, a second hydraulic line connecting said dual main brake valve to a second brake of said complementing brakes, wherein the improvement comprising: a housing defining a generally cylindrical shaped chamber having a first opening at one end of said chamber extending through said housing to said chamber having a diameter less than said chamber such that the diameter transition of said chamber to said first opening is generally symmetric and non-dramatic creating a surface having a generally sloped cross-sectional contour, said first opening connecting with said hydraulic line leading to said first braking means, said chamber having a second opening at the opposing end of said chamber extending through said housing to said chamber; a generally spherical shaped member contained without said chamber having a diameter less than said chamber and greater than said first opening, said spherical member sized to permit the assumption of a mating relationship with said surface such that said first opening can be blocked; a cap fixably mounted in said second opening, said cap having a generally cylindrical passageway extending longitudinally therethrough, said passageway having a longitudinal axis parallel to and radially removed from said longitudinal axis of said chamber, said passageway connecting with said hydraulic line extending from said dual main brake valve, said chamber having a generally vertical orientation such that said first opening is elevated with respect to said second opening and said chamber sized to contain said discreet volume of hydraulic fluid between said spherical member and said first opening.

* * * * *